(12) United States Patent
Cummings

(10) Patent No.: US 6,439,714 B1
(45) Date of Patent: Aug. 27, 2002

(54) DIPVERGENCE ADJUSTING DEVICE FOR OCULAR MOUNTING ASSEMBLY

(75) Inventor: Thomas A. Cummings, Jackson, MI (US)

(73) Assignee: General Scientific Corp., Ann Arbor, MI (US)

( * ) Notice: Subject to any disclaimer, the term of this patent is extended or adjusted under 35 U.S.C. 154(b) by 0 days.

(21) Appl. No.: 09/851,805

(22) Filed: May 9, 2001

(51) Int. Cl.[7] .................................................. G02C 9/00
(52) U.S. Cl. .......................................... 351/57; 351/158
(58) Field of Search ........................... 351/47, 54, 158, 351/41, 57

(56) References Cited

U.S. PATENT DOCUMENTS 5,223,863 A    6/1993  Heine et al. ................. 351/205
5,381,263 A  * 1/1995  Nowak et al. ................. 351/57
5,446,507 A  * 8/1995  Chang ............................ 351/57
5,991,085 A   11/1999  Rallison et al. ............. 359/630

* cited by examiner

Primary Examiner—Hung Xuan Dang
(74) Attorney, Agent, or Firm—Gifford, Krass, Groh, Sprinkle, Anderson & Citkowski, PC

(57) ABSTRACT

An adjusting device for use with a pair of telescopic oculars allows independent rotation of each ocular to correct vertical misalignment between the lines of sight of the oculars. The oculars are part of an optical mounting assembly that includes a housing in which two slide bars are mounted. The oculars are mounted on the slide bars through bosses and mounting screws. An adjusting set screw is threaded through a hole on each slide bar so that it can push against the boss. By tightening or loosening the set screw, the line of sight of each ocular can be adjusted vertically, so that vertical misalignment between the lines of sight is effectively controlled.

5 Claims, 2 Drawing Sheets

DIPVERGENCE ADJUSTING DEVICE FOR OCULAR MOUNTING ASSEMBLY

FIELD OF THE INVENTION

In general, the present invention relates to optical devices and, more particularly, to telescopic oculars.

BACKGROUND OF THE INVENTION

A large variety of optical instruments and miniaturized optical devices are mounted on eyeglass frames or headbands and other supports worn over the head of the user. Such devices include telemicroscopic instruments, which are used for magnifying the work area during precision work, especially in elecronics, medical applications, and surgical operations. These instruments may incorporate one or two telescopic oculars. When a pair of telescopic oculars are used, the possibility of misalignment between the lines of sight of the oculars arises.

While human vision is not as sensitive to horizontal disparity, vertical disparity between the two lines of sight, known also as dipvergence, can cause eyestrain. Vertical disparity that exceeds 30 arc minutes can result in diplopia and cause headaches. For visual comfort, it is recommended that vertical disparity should not exceed 3.4 arc minutes.

There is a need for a simple and convenient mechanism to vertically adjust the lines of sight for optical instruments in small increments to reduce or eliminate vertical disparity.

SUMMARY OF THE INVENTION

The invention is directed to an adjusting device for use with a pair of telescopic oculars. The oculars are part of an optical mounting assembly that includes a housing in which two slide bars are mounted. The oculars are mounted on the slide bars through bosses and mounting screws. An adjusting set screw is threaded through a hole on each slide bar so that it can push against the boss of the ocular and cause a small rotation of the line of sight in the vertical plane. By tightening or loosening the set screw, the line of sight of each ocular can be adjusted incrementally in the vertical plane, so that the vertical disparity, or divergence, between the lines of sight of the oculars is minimized or eliminated. After the desired degree of adjustment is achieved, the corrected configuration of the ocular assembly may be secured by the selective application of adhesive.

DETAILED DESCRIPTION OF THE INVENTION

Figure 1:
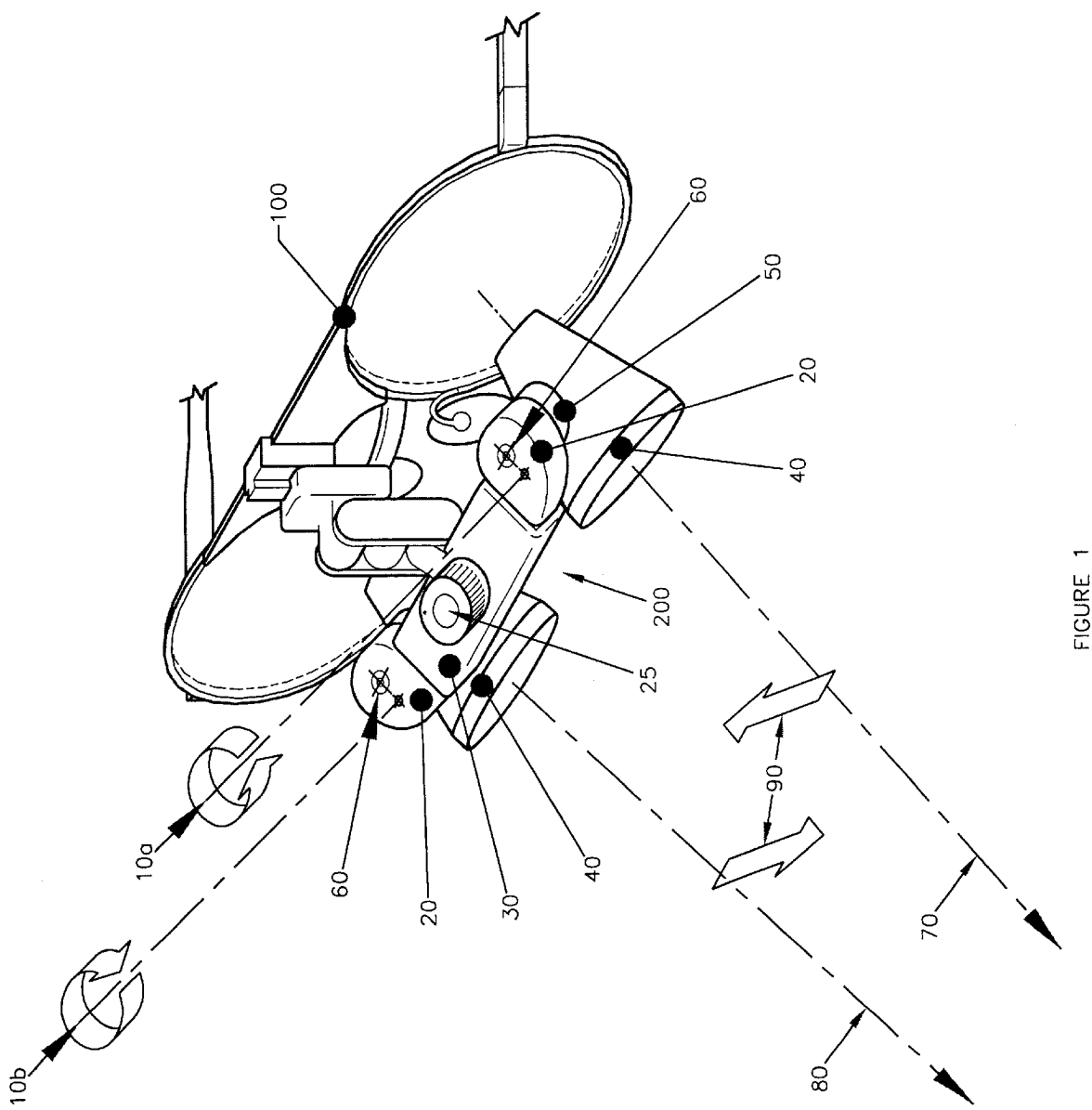
FIG. 1 is a perspective view of the invention.

FIG. 1 is a perspective view of an ocular mounting assembly incorporating the invention 200 and mounted on a pair of eyeglasses 100. The mounting assembly includes a pair of telescopic oculars 40, which are mounted on a pair of slide bars 20. The slide bars are mounted inside a slide bar housing 30. Typically, an adjustment knob 25 at the center of the housing 30 engages the slide bars 20 and allows for adjustment of the interpupillary distance. The left line of sight 70 may not be in perfect vertical alignment with respect to the right line of sight 80, causing a certain degree of dipvergence 90.

Figure 2:
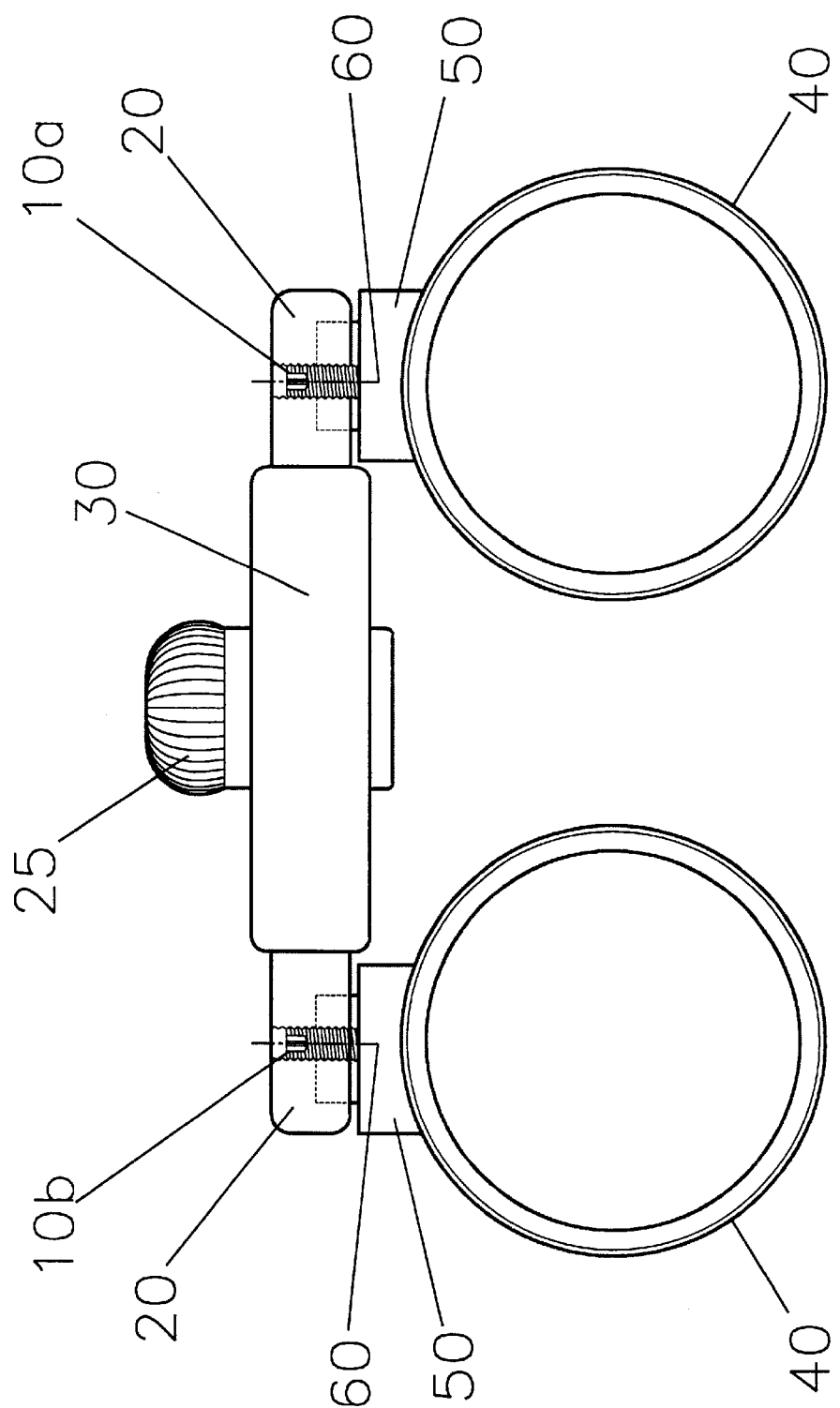
FIG. 2 is an elevated view of the preferred embodiment of the invention.

The adjusting mechanism of the invention 200 is shown in FIG. 1 in perspective and in FIG. 2 in elevated view. The oculars 40 are mounted on the slide bars 20 through ocular mounting bosses 50, which are attached with ocular mounting screws 60. An adjusting set screw 10a, 10b is threaded through each slide bar 20 and against the respective boss 50. Each set screw 10a, 10b is placed in a forward position with respect to the ocular mounting screw 60.

When dipvergence is present, a determination is made whether to adjust one or both lines of sight, depending on the magnitude of the vertical disparity. If, for example, the left line of sight 70 is too high and the right line of sight 80 is too low, then the left set screw 10a is tightened and the right set screw 10b is loosened until the dipvergence effect is substantially eliminated. Tightening the set screw exerts a force on the boss in front of the ocular mounting screw, resulting in a moment capable of rotating the ocular downward in the vertical plane to a desired degree. Loosening the set screw has the opposite effect, i.e. rotating the ocular upward. By tightening or loosening each set screw, fine adjustments to the relative angle of the lines of sight can be effected in the vertical plane. When proper alignment is achieved, adhesive may be applied selectively to lock the assembly in the configuration of least dipvergence, so that the set screws do not shake loose through operational or accidental effects.

Although the dipvergence adjustment has been described in terms of set screws, other similar means providing a mechanical advantage for controlling slight rotations may be employed to correct the dipvergence. Such means include cams, differential screws and other force-exerting lever or rail combinations.

I claim:

1. An adjusting device for a pair of telescopic oculars each having a line of sight, the device comprising:

a mechanism for independently rotating in a vertical plane the line of sight of one of the oculars relative to the other ocular, so as to correct the dipvergence between the lines of sight of the oculars.

2. An adjusting device for a pair telescopic oculars each having a line of sight, the device comprising:

a pair of ocular mounting slide bars mounted inside a slide bar housing;

an ocular mounting boss on each slide bar for mounting each ocular; and adjusters for independently rotating in a vertical plane the line of sight of each ocular by exerting a force from each slide bar to each boss.

3. The device of claim 2, wherein the adjusters comprise set screws threaded from each slide bar against each boss.

4. An improved ocular mounting assembly having a pair of ocular mounting slide bars and a pair of oculars, the improvement comprising:

an ocular mounting boss on each slide bar for mounting each ocular; and a mechanism for independently rotating in a vertical plane the line of sight of one of the oculars relative to the other ocular by exerting a force from one of the slide bars to one of the bosses.

5. The device of claim 4, wherein the rotating mechanism comprises a set screw threaded from the slide bar against each boss.

* * * * *